Aug. 4, 1936.  E. A. ARNDT  2,049,681
WHEEL CARRIER STRUCTURE
Filed Nov. 5, 1934  2 Sheets-Sheet 1
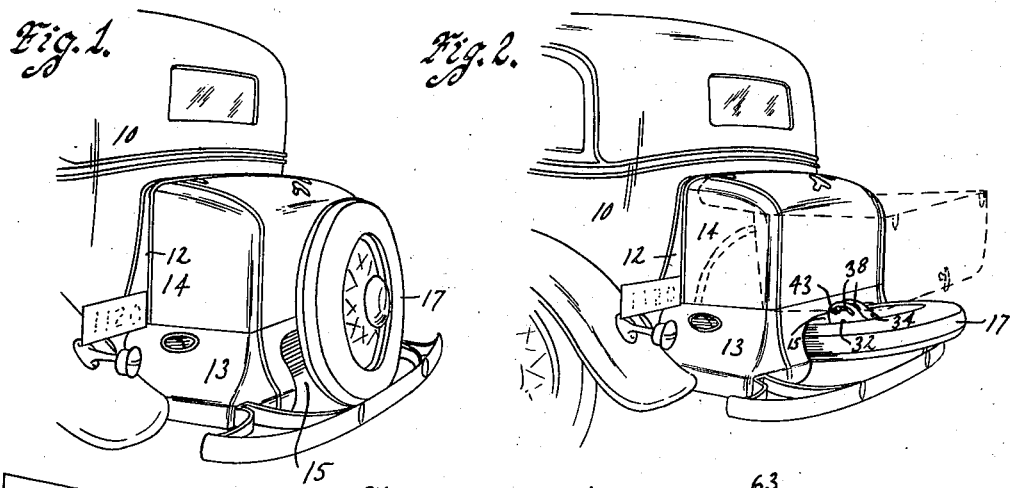
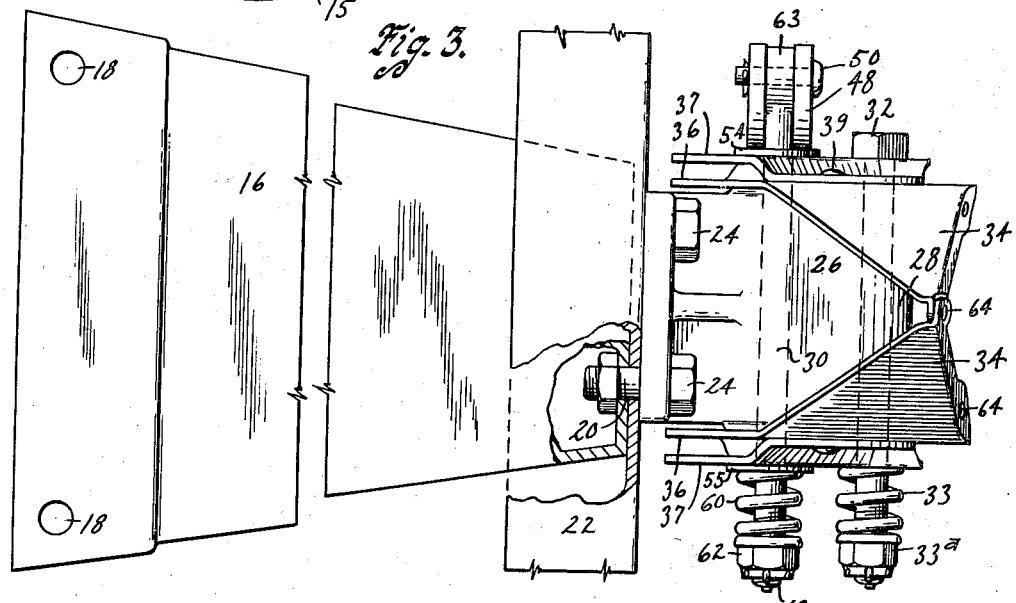
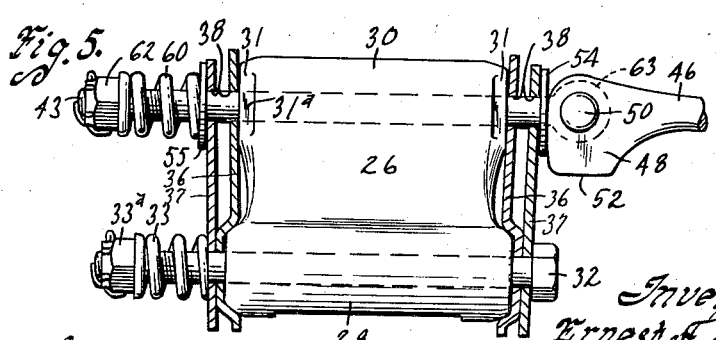
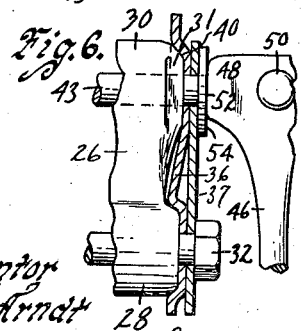
Inventor
Ernest A. Arndt
by Bair, Freeman & Sinclair
Attorneys
Witness
H. S. Munzenmaier

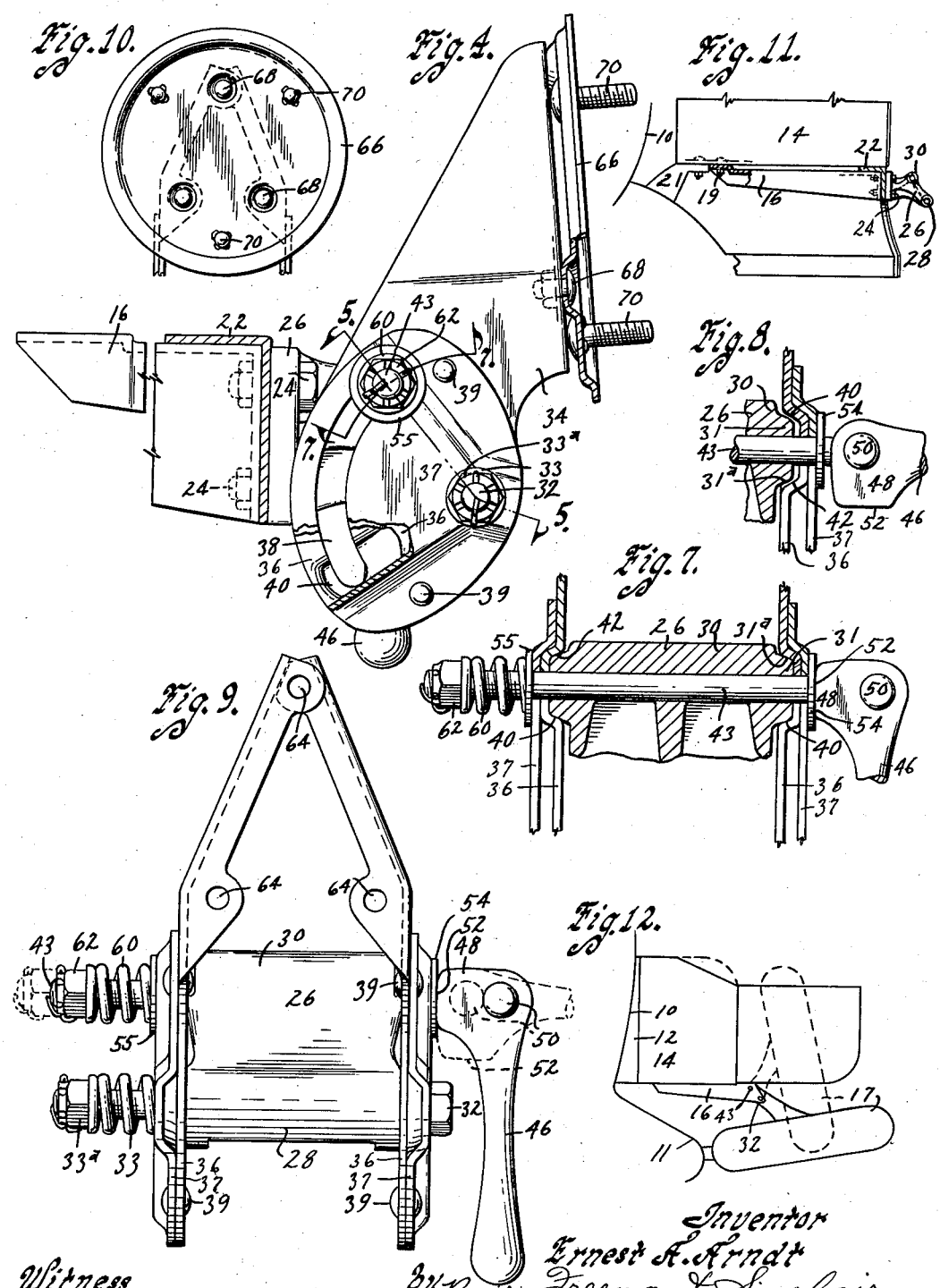

Patented Aug. 4, 1936

2,049,681

UNITED STATES PATENT OFFICE 2,049,681

WHEEL CARRIER STRUCTURE

Ernest A. Arndt, Sioux City, Iowa, assignor to Kari-Keen Manufacturing Co., Sioux City, Iowa, a corporation of Iowa Application November 5, 1934, Serial No. 751,542

12 Claims. (Cl. 224—29)

An object of my present invention is to provide a wheel carrier structure especially adapted for use with an extension trunk such as the type shown in my Reissue Patent No. 16,665, issued June 28, 1927, the structure being comparatively simple, durable and inexpensive to manufacture.

My present application is a continuation in part of my copending application Serial No. 714,070, filed March 5, 1934.

A further object is to provide a carrier structure adapted for an automobile wheel or a bracket supporting a rim on which a spare tire can be mounted so that spare wheels or tires can be supported in positions relative to extension trunks so that they are not carried directly by the trunks yet are so supported that the wheel or tire can be swung from a substantially vertical position behind a trunk to a substantially horizontal position beneath a trunk, so that a trunk of the extension type can thus be extended without the position of the spare wheel or tire interfering with it.

Still a further object is to provide a spare wheel or tire support which is mounted on the supporting means for an extension trunk so that the trunk does not have to carry the weight of the wheel, the wheel carrier structure comprising parts so associated that the wheel can be readily locked in vertical or horizontal position or unlocked for swinging from one position to another.

Still another object is to provide a supporting bracket and a wheel bracket pivotally mounted thereon so that it can swing from one position to another, novel details of construction providing for limiting the movement and for locking the wheel bracket in its different positions.

Still another object is to provide a supporting bracket and a wheel bracket pivoted thereto especially adapted for use in connection with an extension trunk, the position of the pivot being such that the tire is carried at the proper position for good appearance in relation to the top of the trunk when the wheel bracket is in one position, but when the tire is in another position permitting extension of the trunk, the tire extends farther back than the original top of the trunk which is the back of the trunk when in extended position.

A further and specific object is to provide a supporting bracket and a wheel bracket pivoted thereto, one bracket having depressions and the other one having a projection and one bracket having a portion constrained to frictionally engage the other bracket so that the wheel bracket can be temporarily maintained of its own accord in different positions wherein one of the depressions registers with the projection and to provide an additional means for positively locking one bracket relative to the other in the positions which they temporarily assume by reason of such construction and which positions are snap actingly assumed.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of an automobile having thereon an extension trunk, my wheel carrier structure being attached and supporting a wheel in substantially vertical position.

Figure 2 is a similar view showing the wheel supported in substantially horizontal position and showing in dotted lines the open position of the extension trunk.

Figure 3 is an enlarged plan view of the wheel carrier structure, parts being broken away to conserve space on the drawings.

Figure 4 is a side elevation of the structure shown in Figure 3 and illustrating an adapter plate used therewith.

Figure 5 is a sectional view on the line 5—5 of Figure 4 except showing the wheel bracket adjusted to an intermediate position instead of one of its extreme positions as in Figure 4.

Figure 6 is a view similar to a portion of Figure 5 showing the wheel bracket adjusted to one of the extreme positions as in Figure 4.

Figure 7 is a sectional view on the line 7—7 of Figure 4 showing the clamping bolt tightened.

Figure 8 is a view similar to a portion of Figure 7 showing the parts associated before tightening of the clamping bolt.

Figure 9 is a rear elevation of the supporting and wheel brackets shown in Figures 3 and 4.

Figure 10 is a rear elevation showing a portion of the wheel bracket in dotted lines and an adapter plate used in connection therewith.

Figure 11 is a side elevation with a part thereof in section showing the attachment of the wheel carrier structure to the trunk and its support; and Figure 12 is a diagrammatic side elevation showing the relation of parts when in different positions.

On the accompanying drawings, I have used the reference numeral 10 to indicate an automobile body. A spacer 12 extends rearwardly therefrom and is backed by an extension trunk 14. The trunk 14 is supported on a supporting platform 13 suitably secured to the automobile in any desired manner. The support 13 is cut away as at 15 to permit a wheel 17 carried by my wheel supporting structure to assume a horizontal position as shown in Figure 2.

The wheel supporting structure comprises a supporting bracket 16 preferably of channel-shape, having openings 18 for bolts 19 and openings 20 for bolts 24 which extend through a cross bar portion 22 of the supporting means 13. The trunk 14 is supported on the supporting means 13 and may also be supported by a bracket 21 (see Figure 11). The bolts 19 may extend through the bottom of the trunk so that the forward end of the supporting bracket 16 is rigidly supported by its adjacency to the bracket 21. The cross bar portion 22 of the supporting means 13 is quite rigidly supported on bumper extensions or other parts supplied by the manufacturer of the extension trunk and its support.

The bolts 24 retain a casting 26 in position, which is in effect a part of, or an extension of, the supporting bracket 16. The casting 26 has hubs 28 and 30 formed thereon. A pivot pin 32 extends through the hub 28. A spring 33 is provided thereon to prevent any looseness of the parts and thus avoid rattling or other noises. A nut 33a is provided on the pivot pin 32 to retain it and the spring 33 in assembled position relative to the casting 26. The ends of the hub 30 have projections 31 provided with inclined upper and lower edges 31a best shown in Figure 7.

A wheel bracket 34 is pivotally mounted on the pin 32. The wheel bracket 34 is of fork-like construction having side plates 36 reinforced by side plates 37, the two being riveted together as indicated at 39. The side plates 36 and 37 being formed of sheet metal are inherently resilient and the plates straddle the casting 26 and are initially formed of the proper distance between them so that they frictionally engage the casting 26 when in straddling position relative thereto. The side plates 36 and 37 are provided with arcuate slots 38 which register with the hub 30. The slots 38 have a countersunk effect at their ends produced by forming depressions 40 in the plates 36, which depressions extend to the plates 37, the main planes of the plates 36 and 37 being spaced apart as clearly shown on the drawings. The depressions 40 have inclined sides indicated at 42.

A clamping bolt 43 extends through the hub 30 and the slots 38 of the side plates 36 and 37. Mounted on the clamping bolt is a spring 60 and a nut 62. The nut is at one end of the bolt while at the opposite end of the bolt I provide an eye 63 (see Figures 3 and 5) to which a cam lever 46 is pivoted by a pin 50. The cam lever has side plates 48 on opposite sides of the eye 63.

The side plates 48 have flat portions 52 for engagement at times with a washer 54. A washer 55 is also provided on the clamping bolt 43 between the spring 60 and one of the side plates 37.

The wheel bracket 34 is provided with perforations 64 through which bolts for the wheel 17, or in which studs for it, may be mounted. The bracket 34 is of course designed for a wheel having mounting perforations of certain spacing and can be adapted for wheels having other spacings by means of adapter plates, such as the one illustrated at 66. The adapter plate may be riveted in position by rivets 68 and be provided with studs 70 at the proper positions for various other wheels.

Although I have disclosed the bracket 34 as provided for wheels, it is obvious that rims or other supporting devices may be secured to it whereby the carrier is adapted for spare tires only instead of spare wheels having tires mounted on them.

*Practical operation*

In the operation of my wheel carrier, it may be locked in position as shown in Figures 3, 6, 7 and 9 by swinging the cam lever 46 downwardly so that the flat portions 52 of the cam lobes or side plates 48 engage with the washer 54, whereupon the spring 60 tends to retain the cam lever in this position.

The clamping bolt 43 can be released to the dotted line position of Figure 9 for instance which is accomplished by swinging the cam lever counterclockwise from the position of Figure 7 to the position of Figure 8. This loosens the side plates 36 and 37 or more specifically the depressions 40 of the side plates 36 from the projections 31 of the hub 30 as shown in Figure 8.

The wheel carrier bracket may now be manually swung from the position of Figure 1 to the position of Figure 2 which first causes the inclines 42 of the depressions 40 to slide out relative to the inclined sides 31a of the projections 31 so that the wheel bracket can be swung relative to the supporting bracket, an intermediate position being shown for instance in Figure 5. In this figure, it will be noted that the side plates 36 and 37 are inclined slightly outwardly which is permitted by their inherent resiliency and which causes the depressions 40 at the lower ends of the slots 38 (shown in the broken away portion of Figure 4) to snap over the projections 31 when the spare wheel has assumed the horizontal position of Figure 2. This will temporarily retain the bracket, while if it is to be permanently maintained as when the trunk is extended as in dotted lines in Figure 2 or in full lines in Figure 12, the clamping bolt 43 can be tightened.

The spring 60 compensates for any variations in dimensions and prevents rattling of the parts in addition to retaining the cam lever in locked position.

In Figure 12 I illustrate the open position of the extension trunk and the corresponding position of the spare wheel and tire in full lines, the relative positions of these parts being shown in dotted lines when the trunk is in non-extended position. The pivot bolt 32 is located considerably below the center of the wheel 17 and below the rear lower corner of the trunk when closed as well as back of this corner. Accordingly, the top of the tire is in the dotted line position at the proper point for good appearance in connection with the trunk when closed, yet is well back of the rear wall of the trunk when extended so that the forward edge of the tire does not interfere with the gas tank and skirt indicated at 11. It is thus apparent that the position of the pivot 32 is important.

Although I have illustrated my wheel carrier in connection with an extension trunk, it can also be used without a trunk and with or without luggage carriers of either the non-extensible or extensible type. When used on an automobile without an extension trunk, it permits a luggage carrying rack to be installed just ahead of the tire and this rack can be extended rearwardly when the tire is swung to the horizontal position or can remain in its installed position and additional space is provided for carrying additional luggage when the tire is moved to the horizontal position.

My carrier is also advantageous on late model cars which carry tires on a forward slope over a luggage carrying compartment in the back of the automobile. My wheel carrier, when used in connection with this type of automobile, facilitates the use of a larger lid or a larger opening for the luggage carrying compartment.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A wheel carrier structure comprising a supporting bracket, a wheel bracket pivoted thereto for positioning a wheel carried thereby in either of two positions at substantially right angles to each other, one of said brackets comprising a plate having an arcuate slot and the other having a bolt hole and a clamping bolt through said slot and said bolt hole, said plate having offset portions adjacent the ends of said slot and the other bracket having a projection selectively engageable with said offset portions.

2. A wheel carrier structure comprising a supporting bracket, a wheel bracket pivoted thereto for positioning a wheel carried thereby in either of two positions at substantially right angles to each other, one of said brackets having an arcuate slot and the other having a bolt hole, a clamping bolt through said slot and said bolt hole, said slot having its ends countersunk and the other bracket having a projection engageable with the countersunk portions thereof and a spring on said clamping bolt urging said countersunk portions of said slot toward said projection.

3. For use with an extension trunk and supporting means therefor, a wheel carrier structure comprising a supporting bracket supported on said supporting means, a wheel bracket pivoted thereto for positioning a wheel carried thereby in either a substantially vertical or a substantially horizontal position, one of said brackets having an arcuate slot and the other having an opening, a clamping bolt through said slot and said opening, said slot having its ends countersunk and the other bracket having a projection for coacting with the countersunk portions of said slot, a spring on said clamping bolt and a cam for imparting longitudinal movement to said clamping bolt relative to said brackets.

4. For use with an extension trunk and supporting means therefor, a wheel carrier structure comprising a supporting bracket supported on said supporting means, a wheel bracket pivoted thereto for positioning a wheel carried thereby in either a substantially vertical or a substantially horizontal position, one of said brackets having an arcuate slot and the other having an opening, a clamping bolt through said slot and said opening, said slot having its ends countersunk and the other bracket having a projection to snappingly coact with the countersunk portions of said slot and a spring on said clamping bolt.

5. For use with an extension trunk and supporting means therefor, a wheel carrier structure comprising a supporting bracket supported on said supporting means, a wheel bracket pivoted thereto for positioning a wheel carried thereby in either a substantially vertical or a substantially horizontal position, one of said brackets comprising a plate having an arcuate slot and the other having an opening, a clamping bolt through said slot and said opening, said plate having offset portions adjacent the ends of said slot and the other bracket having a projection for coacting selectively with said offset portions and a cam for actuating said clamping bolt to clamped position.

6. For use with an extension trunk and supporting means therefor, a wheel carrier structure comprising a supporting bracket supported on said supporting means, a wheel bracket pivoted thereto for positioning a wheel carried thereby in either a substantially vertical or a substantially horizontal position, one of said brackets comprising a plate having an arcuate slot and the other having an opening and a clamping bolt through said slot and said opening, said plate having offset portions adjacent the ends of said slot, the other bracket having a projection for coacting selectively with said offset portions of said plate.

7. For use with an extension trunk and supporting means therefor, a wheel carrier structure comprising a supporting bracket supported on said supporting means, a wheel bracket pivoted thereto for positioning a wheel carried thereby in either a substantially vertical or a substantially horizontal position, one of said brackets comprising a plate having an arcuate slot and a pair of offset portions and the other having a projection to enter either of said portions when registering therewith, the other of said brackets having an opening and a clamping bolt through said slot and said opening, one bracket having inherent resiliency to cause frictional engagement between the brackets and partial entrance of said projection in said offset portions to thereby temporarily retain the wheel bracket in adjusted position relative to the supporting bracket till said clamping bolt is tightened.

8. A wheel carrier structure comprising a supporting bracket and a wheel bracket pivoted thereto for positioning a wheel carried thereby in either of two positions at substantially right angles to each other, one of said brackets having a projection and the other one having a plate resiliently constrained to frictionally engage therewith and provided with depressions to temporarily receive said projection in either of the two positions of the wheel bracket and means for manually locking said wheel bracket against movement from either position.

9. A wheel carrier structure comprising a supporting bracket, a wheel bracket pivoted thereto for positioning a wheel carried thereby in either of two positions at substantially right angles to each other, one of said brackets having a projection and the other one having a plate resiliently constrained to frictionally engage therewith and provided with depressions to temporarily receive said projection in either of the two positions of the wheel bracket, one of said brackets having an arcuate slot and the other having a bolt hole, a clamping bolt through said slot and said bolt hole and a cam for tightening said clamping bolt.

10. A wheel carrier structure comprising a supporting bracket, a wheel bracket pivoted thereto for positioning a wheel carried thereby in either of two positions at substantially right angles to each other, one of said brackets having an arcuate slot and the other having a bolt hole, a clamping bolt through said slot and said bolt hole, said slot having its ends countersunk, the other bracket having a projection engageable with the countersunk portions thereof, a spring on said clamping bolt urging said countersunk portions of said slot toward said projection and a cam for tightening said clamping bolt.

11. A wheel carrier structure comprising a supporting bracket, a wheel bracket pivoted thereto for positioning a wheel carried thereby in either of two positions at substantially right angles to each other, said wheel bracket being forked to straddle said supporting bracket resilient means urging the forked sides of the wheel bracket toward the supporting bracket, a projection on one of said brackets, the other bracket having a depression for receiving said projection and thereby temporarily positioning said wheel bracket and manually operable means for positively urging the forked sides of the wheel bracket toward the supporting bracket to clamp the wheel bracket in the position desired relative thereto and against movement from such position.

12. For use with an extension trunk and supporting means therefor, a wheel carrier structure comprising a supporting bracket suported on said supporting means, a wheel bracket pivoted thereto for positioning a wheel carried thereby in either a substantially vertical or a substantially horizontal position, one of said brackets straddling the other one and having resilient sides constrained to frictionally engage the other bracket and depressions to temporarily receive portions of the other bracket when the wheel bracket assumes either of said positions and means for manually and positively locking said wheel bracket relative to said supporting bracket in either position of the wheel bracket.

ERNEST A. ARNDT.